United States Patent [19]

Keller

[11] 4,078,928

[45] Mar. 14, 1978

[54] PHOTOELECTROPHORETIC IMAGING METHOD

[75] Inventor: Carol K. Keller, Rochester, N.Y.

[73] Assignee: Xerox Corporation, Stamford, Conn.

[21] Appl. No.: 554,890

[22] Filed: Mar. 3, 1975

[51] Int. Cl.² .............................................. G03G 13/22
[52] U.S. Cl. ..................................... 96/1 PE; 96/1.4; 96/1.3
[58] Field of Search ............... 96/1 PE, 1.2, 1.3, 1.4; 204/181 PE

[56] References Cited

U.S. PATENT DOCUMENTS

| | | |
|---|---|---|
| 3,384,565 | 5/1968 | Tulagin et al. ................. 96/1 PE X |
| 3,384,566 | 5/1968 | Clark ............................... 96/1 PE X |
| 3,477,934 | 11/1969 | Carreira et al. ............... 204/181 PE |
| 3,535,221 | 10/1970 | Tulagin ............................ 96/1.3 X |
| 3,551,313 | 12/1970 | Walsh .............................. 96/1 PE X |
| 3,553,093 | 1/1971 | Putnam et al. .................... 96/1.3 |
| 3,645,874 | 2/1972 | Wells .............................. 96/1 PE X |
| 3,719,484 | 3/1973 | Egnaczak ............................ 96/1.2 |

*Primary Examiner*—John D. Welsh
*Attorney, Agent, or Firm*—James J. Ralabate; Eugene O. Palazzo; John E. Crowe

[57] ABSTRACT

There is disclosed a photoelectrophoretic imaging method wherein, after an image is formed on the surface of an electrode, the image is subjected to an electrical field, under darkened conditions, established between the electrode carrying the image and another electrode to enhance the image.

9 Claims, 3 Drawing Figures

PHOTOELECTROPHORETIC IMAGING METHOD

BACKGROUND OF THE INVENTION

This invention relates to a photoelectropbretic imaging method and, more particularly, to a method wherein an image is enhanced by subjecting the image to an applied electrical field in the absence of illumination.

In the photoelectrophoretic imaging method a layer of an imaging suspension comprising electrically photosensitive pigment particles in a carrier liquid is typically disposed between a pair of electrodes, at least one of which is at least partially transparent, exposed to an imagewise pattern of activating electromagnetic radiation and subjected to an electrical field established between the electrodes with the result that complementary images are formed on the surfaces of the respective electrodes.

Many embodiments of photoelectrophoretic imaging are known in the art. U.S. Pat. No. 3,553,093 discloses a polychromatic photoelectrophoretic imaging method wherein a layer of imaging suspension is arranged between a pair of electrodes, exposed to imagewise activating radiation and subjected to an electrical field to form an image on at least one of the electrodes. Subsequently, the other electrode is removed, either cleaned or replaced with another electrode and the imagewise exposure and electrical field application are repeated at least one additional time to improve the quality of the final image.

The present invention relates to a method for enhancing the degree of color separation and minimum density in polychromatic photoelectrophoretic imaging and for enhancing the minimum density characteristics for monochromatic images made by photoelectrophoretic imaging.

SUMMARY OF THE INVENTION

It is an object of this invention to provide the above noted desirabe features.

It is another object to provide a method for enhancing the fidelity of color reproduction in photoelectrophoretic imaging.

It is a further object to provide a method for reducing the minimum density characteristics of reproduced images made by photoelectrophoretic imaging.

It is still another object to provide a polychromatic photoelectrophoretic imaging method providing enhanced color separation in the reproduced images.

A further object of the invention is to provide a method wherein a reproduced image is subjected to an electrical field under darkened conditions.

BRIEF SUMMARY OF THE INVENTION

These and other objects and advantages are accomplished in accordance with the present invention by providing a photoelectrophoretic imaging method wherein, after an image is formed on the surface of an electrode, the image is subjected to an electrical field, under darkened conditions, established between the electrode carrying the image and another electrode to enhance the image.

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DESCRIPTION OF THE PREFERRED EMBODIMENTS

Generally, as aforesaid, in photoelectrophoretic imaging a layer of an imaging suspension is arranged between a pair of electrodes subjected to an electrical field and exposed to an imagewise pattern of activating electromagnetic radiation. Preferably, the electrical field applied across the imaging suspension layer is established between electrodes having certain preferred properties, i.e., an injecting electrode and a blocking electrode and the exposure to activating radiation occurs simultaneously or substantially simultaneously with field application. However, as is taught in various prior art patents including, for example, U.S. Pat. Nos. 3,595,770; 3,647,659; and 3,447,934 such a wide variety of materials and modes for associating an electrical bias therewith, e.g., charged insulating webs, may serve as the electrodes, that is, the means for applying the electrical field across the imaging suspension layer, that opposed electrodes generally can be used; and the exposure and field application steps may be sequential. In preferred embodiments of the practice of the photoelectrophoretic imaging method as described herein, one electrode may be referred to as the injecting electrode and the opposite electrode as the blocking electrode. The terms "blocking electrode" and "injecting electrode" as used throughout this application should be understood and interpreted in the context of these comments.

Figure 1:
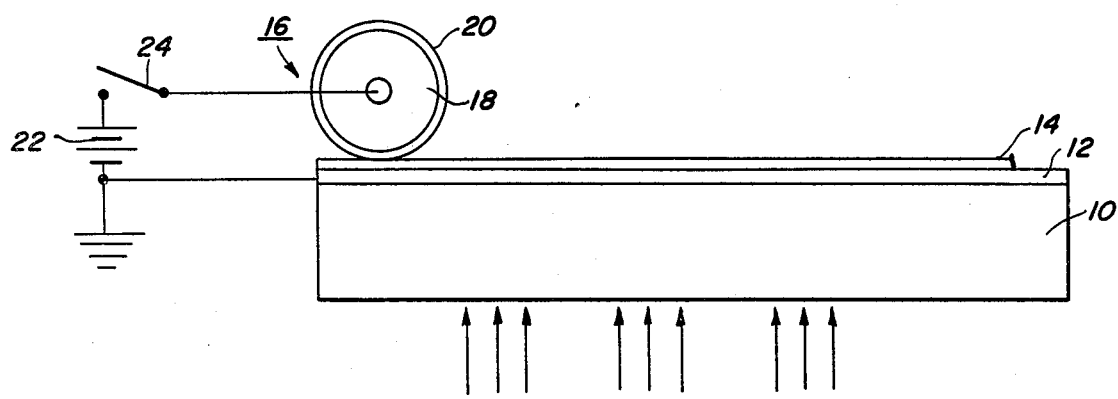
FIGS. 1 and 2 are partially schematic cross-sectional views of a photoelectrophoretic imaging system illustrating one embodiment of the invention.

Referring now to FIG. 1 there is illustrated in partially schematic, cross-sectional form, an embodiment of a photoelectrophoretic imaging system wherein a substantially transparent substrate 10 and a substantially transparent conductive coating 12 comprises a substantially transparent electrode. A typical suitable transparent electrode material is commercially available under the name of NESA glass from Pittsburgh Plate Glass Co., and comprises a thin optically transparent layer of tin oxide deposited on a transparent glass substrate. This electrode will be referred to hereinafter as the "injecting electrode." Coated on the surface of the injecting electrode is a layer of an imaging suspension 14 comprising finely divided electrically photosensitive pigment particles dispersed in a carrier liquid. The term "electrically photosensitive" as applied to the imaging particles dispersed in the carrier liquid is intended to encompass any particle which, once attracted to the injecting electrode, will migrate away from it under the influence of an electrical field when the particle is exposed to electromagnetic radiation. For a detailed theoretical description of the apparent mechanism of operation of photoelectrophoretic imaging see U.S. Pat. Nos. 3,384,565 and 3,384,566.

The imaging suspension may comprise any suitable electrically photosensitive particles dispersed in a carrier liquid and may include one type of particle or a plurality of differently colored particles in finely divided powder form. The suspension may be employed in either the monochromatic or polychromatic modes. Any suitable electrically photosensitive pigment particles may be used according to the invention including, for example, the types disclosed in U.S. Pat. Nos. 2,980,847 and 3,681,064. An extensive list of typical suitable electrically photosensitive pigment particles is provided in U.S. Pat. No. 3,384,488. Accordingly, an extensive discussion of electrically photosensitive pigment materials is not required here.

Imaging suspension layer 14 may be coated on the surface of electrode 10 by any suitable technique. In a preferred embodiment layer 14 may be deposited electrophoretically such as is disclosed in U.S. Pat. No. 3,620,948, by means of a biased roller or some other suitable biased member.

Any suitable electrically insulating liquid may be used as the carrier liquid in the imaging suspension. Typical insulating carrier liquids include: long chain saturated aliphatic hydrocarbons such as decane, dodecane, and tetradecane; kerosene fractions such as Sohio Odorless solvents available from the Standard Oil Company of Ohio, Isopar G commercially available from the Humble Oil Company of New Jersey; molten thermoplastic materials such as paraffin wax and bees wax; mineral oil; vegetable oils such as linseed oil and olive oil; silicone oils such as dimethylpolysiloxane (Dow Corning Company); fluorinated hydrocarbons such as Freon; and mixtures thereof. The imaging suspension may also contain a sensitizer and/or binder.

Above the imaging suspension layer 14 is arranged a second electrode, generally designated 16, commonly referred to as the blocking electrode, which in this embodiment is shown as a roller but which may be of any suitable configuration such as for example, a flat plate. The blocking electrode comprises a conductive central core 18 covered with a layer of a suitable electrically insulating material 20 such as, for example, paper, coated paper such as baryta paper, polymeric materials such as Tedlar, Mylar (available from duPont) and the like. It is preferred to employ blocking material layer 20 to eliminate the possibility of electrical shorting occurring across the electrodes. Although the injecting electrode has been illustrated as transparent and exposure as being effected through the injecting electrode, it should be noted that the blocking electrode could be the transparent electrode and exposure could be made through it where it is so desired. It should also be noted that the electrode through which exposure is made need not be completely transparent to the activating radiation but rather it may only be partially transparent; the only requirement is that the electrode transmit enough activating electromagnetic radiation to cause imaging to occur. It should also be understood that although there has been illustrated a particular electrode configuration the photoelectrophoretic imaging method of the invention may be practiced with either or both of the electrodes in the form of drums, rollers, flat plates, traveling webs, etc.

The blocking electrode 16 is connected to one side of potential source 22 through a switch 24. The opposite side of potential source 22 is connected to the conductive layer 14 of the injecting electrode so that when switch 24 is closed an electrical field is applied across the imaging suspension layer 14 between the electrodes. The imaging suspension is exposed to an imagewise pattern of activating electromagnetic radiation (represented by the arrows) through the transparent injecting electrode. The imagewise electromagnetic radiation may be provided by any suitable means. In operation, blocking electrode 16 is caused to roll across the surface of hhe injecting electrode with switch 24 closed during the period of exposure. Upon completion of the roller traverse across the injecting electrode there are formed complementary images on the surfaces of the electrodes. It should be noted that the exposure and field application steps may occur simultaneously or, alternatively, the electrical field may be applied after exposure has been terminated such as is disclosed in U.S. Pat. No. 3,647,659 which teaches electrophoretically depositing the imaging suspension layer first prior to exposure. There are formed on the respective surfaces of electrodes 10 and 16 complementary images. The positive and negative images may be formed on either electrode dependent, inter alia, upon the polarity of the electrical field applied across the suspension and the electrical characteristics of the pigment particles.

Figure 2:
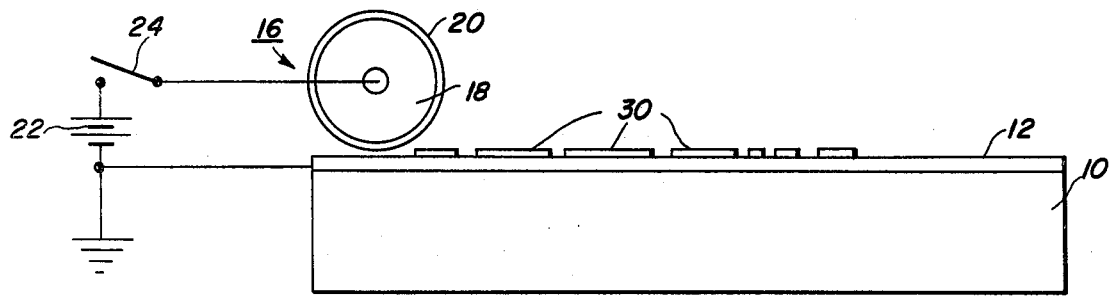

In accordance with the present invention the image residing on one of the electrodes is then subjected to an electrical field, in the absence of illumination, established between the electrode upon which it resides and another electrode. The other electrode may be the same electrode used in the image forming steps and which preferably has been subsequently cleaned or it may be another similar electrode. As illustrated in FIG. 2, the projection of imagewise activating radiation is terminated and the electrode 16 is advanced across the surface of the electrode 10 upon which there resides image 30 with switch 24 closed. Hence, an electrical field is applied across the image under darkened conditions to enhance the quality of the image. For the purposes of this specification and the appended claims, the term "darkened conditions" means a level of ambient illumination which is insufficient to substantially expose or cause an alteration of the charge on the electrically photosensitive pigment particles. The applied image enhancing electrical field may be of the same polarity as that applied during formation of the image in which case it may be less than, equal to, or greater in magnitude than the latter or it may be opposite in polarity in which case it is typically less in magnitude. As aforesaid, during the application of the image enhancing electrical field, electrode 16 includes a clean outer surface. During this image enhancing step, a transfer of pigment particles occurs from the image residing on electrode 10 to electrode 16 and accordingly the presence of a clean outer surface on electrode 16 eliminates any possible interactions between previously transferred particles and the particles transferred during this step.

The image obtained on the surface of electrode 10 after the image enhancing step illustrated in FIG. 2 may be fixed to the surface of the electrode by any suitable technique such as by solvent evaporation, spray coating, or the like. Preferably, the image is transferred to a receiver material and fixed thereto in which case the electrode may be cleaned and reused in a recyclable imaging system. The image transfer step may be effected by adhesive pickoff techniques or preferably by electrostatic field transfer such as is disclosed in U.S. Pat. No. 3,655,370. Any suitable material may be used as the receiver material for the image including, for example, paper and various transparent polymeric materials such as Mylar, Tedlar and the like.

Figure 3:
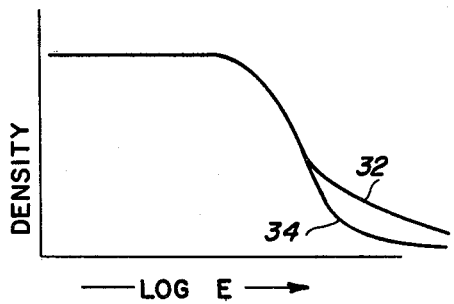
FIG. 3 is a graphical illustration of density versus exposure for reproduced images illustrating the image enhancement which may be achieved with the method of the invention.

The application of the image enhancing electrical field to a previously formed image according to the invention has been found to enhance the quality of the reproduced image by reducing the minimum density characteristics of the reproduction (that is, the presence of pigment in areas corresponding to white areas or light tones of the original) and, with respect to polychromatic images, by additionally providing an increased degree of color separation. The effect of the enhancement is illustrated in FIG. 3 which shows a typical curve of image density vs the log of light exposure (i.e., light intensity × time) for a reproduction without the enhancement, designated by numeral 32 and a reproduction with enhancement according to the invention, designated by numeral 34. Curve 34 demonstrates a desirable lower level of minimum density than does curve 32. It is theorized that the image enhancement obtained according to the invention is attributable to some type of memory characteristic which is exhibited by the electrically photosensitive particles. It is thought that the charge retained by the particles for an interval of time subsequent to the removal of the imagewise pattern of radiation used for imaging is such that by subsequently applying the image enhancing electrical field under darkened conditions during the appropriate period of time a further transfer of particles is accomplished. This further transfer of particles leads to the enhancement of the image according to the invention. It should be noted that the inventive method has been observed to be operative through extensive experimentation and there is no intention to limit the operation of the method to any proposed theory of operation; nevertheless the proposed theoretical mechanism is consistent with observed results and is presented here to better aid those skilled in the art to understand and practice the invention.

Preferably the image enhancing electrical field is applied immediately after the image forming steps have been practiced, for example, is about 1 second or so. Generally, this electrical field should be applied in about 1.5 minutes after removal of the imagewise radiation. The magnitude of the image enhancing electrical field is dependent upon its polarity with respect to that of the electrical field across the suspension layer during imaging. When it is of the same polarity, the magnitude extends from about 10 volts for suspensions of the type referred to herein to the highest potential which can be sustained across the suspension. For example, these suspensions may be able to sustain up to about 8000 volts. When the image enhancing field is of opposite polarity, the magnitude of this field may extend from about 10 volts up to a potential at which removal of a portion of the image occurs, for example, up to an applied potential of about 200 volts for the suspensions referred to herein.

When used in the course of the present discussion, the term "injecting electrode" should be understood to mean an electrode which will preferably be capable of exchanging charge with the photosensitive particles of the imaging suspension when the suspension is exposed to light so as to allow for a net change in the polarity of the activated particles. By the term "blocking electrode" is meant one which is substantially incapable of injecting charge carriers into the above-mentioned photosensitive particles as compared to the injecting electrode, thus substantially blocking direct current. The use of the blocking electrode serves to minimize particle oscillation in the system and to prevent electrical shorting between the electrodes.

It is preferred that the injecting electrode be an optically transparent material, such as glass overcoated with a conductive material such as tin oxide, copper, copper iodide, gold or the like; however, other suitable materials including many semiconductive materials such as raw cellophane, which are ordinarily not thought of as being conductors but which are still capable of accepting injected charge carriers of the proper polarity under the influence of an applied electric field may be used within the course of the present invention.

The blocking layer of the blocking electrode, on the other hand, is selected so as to prevent or greatly retard the injection of charge carriers into the photosensitive pigment particles when the particles reach the surface of this electrode. Although a blocking electrode material need not necessarily be used in the system, the use of such a layer is preferred because of the markedly improved results which it is capable of producing. It is preferred that the blocking layer, when used, be either an insulator or a semiconductor which will not allow for the passage of sufficient charge carriers, under the influence of the applied field, to discharge the particles bound to its surface, thereby preventing particle oscillation in the system. The result is enhanced image density and resolution. Even if the blocking layer does allow for the passage of some charge carriers to the photosensitive particles, it still will be considered to fall within the class of preferred materials if it does not allow for the passage of sufficient charge so as to recharge all the particles to the opposite polarity.

Exemplary of the preferred blocking materials used are baryta paper, Tedlar, Mylar, and polyurethane. Any other suitable materials having a resistivity of at least about $10^7$ ohms-cm may be employed. Typical materials in this resistivity range include cellulose acetate coated papers, cellophane, polystyrene and polytetrafluoroethylene. The core of the blocking electrode generally will consist of a material which is fairly high in electrical conductivity. Typical conductive materials including conductive rubber, and metal foils of steel, aluminum, copper and brass have been found suitable. Preferably, the core of the electrode will have a high electrical conductivity in order to establish the required field differential in the system; however, if a material having a low conductivity is used, a separate electrical connection may be made to the back of the blocking layer of the blocking electrode. For example, the blocking layer or sleeve may be a semiconductive polyurethane material having a resistivity of from about $10^8$ to $10^9$ ohms-cm. If a hard rubber non-conductive core is used then a metal foil may be employed as a backing for the blocking sleeve. Other materials that may be used in conjunction with the injecting and blocking electrodes and other photosensitive particles which may be used as the electrically photosensitive pigments and the various conditions under which the process operates may be found in the U.S. patents described above.

For monochromatic imaging, typically, particles of a single color are dispersed in the carrier liquid and exposed to an image. A single color image results, corresponding to conventional black-and-white photography. Any desired single color image can be obtained in this fashion.

For polychromatic imaging, at least two differently colored pigment particles are incorporated in the imaging suspension. The selection depends largely upon the photosensitivity and the spectral sensitivity desired. The particles are selected so that those of different colors respond to different wavelengths in the visible spectrum corresponding to their principal absorption bands. Also, the pigments should be selected so that their spectral response curves do not have substantial overlap, thus allowing for good color separation and subtractive multicolor image formation.

In a typical polychromatic system, the particle suspension may include cyan colored particles which are sensitive mainly to red light, magenta colored particles which are sensitive mainly to green light, and yellow colored particles which are sensitive mainly to blue light. When mixed together in a carrier liquid, these particles produce a black-appearing liquid. When one or more of the particles are caused to migrate from injecting electrode 10 toward the second electrode, they leave behind particles which produce a color equivalent to the color of the activating light. Thus, for example, red light exposure causes the cyan colored pigment to migrate leaving behind the magenta and yellow pigments which combine to produce red in the final image. In the same manner, blue and green colors are reproduced by removal of yellow and magenta, respectively. When white light impinges upon the mix, all pigments migrate, leaving no pigmentary color on the electrodes. No exposure leaves behind all pigments which combine to produce a black image. This is an ideal technique of subtractive color imaging in that the pigment particles are each composed of a single component which is both the image colorant and the photosensitive medium.

From about 2 to about 10 percent pigment by weight of imaging particles in the suspension have been found to produce good results. The addition of small amounts (generally ranging from 0.5 to 5 mol. percent) of electron donors or acceptors to the suspensions may impart significant increases in system photosensitivity.

A wide range of voltages may be applied between the electrodes in the system during formation of the image. For good image resolution, high image density and low background it is preferred that the potential applied be such as to create an electrical field of at least about 300 volts per mil across the imaging suspension. For example, when the imaging suspension is coated to a thickness of about 1 mil, the electrode spacing will be such that an applied potential of about 300 volts produces a field across the suspension of about 300 volts per mil. Potentials as high as 8,000 volts may be applied to produce images of high quality. As is apparent, the applied potential necessary to obtain the desired field strength will vary depending upon the interelectrode gap as well as the type and thickness of the blocking material utilized. The imaging suspension may be coated to a thickness of up to about 50 microns and preferably to about 25 microns.

The invention will now be further described in detail with respect to specific preferred embodiments thereof by way of Examples, it being understood that these are intended to be illustrative only and the invention is not limited to the materials, percentages, conditions, etc. recited therein. All parts and percentages are by weight unless otherwise specified. Apparatus of the general type illustrated in FIGS. 1 and 2 is used.

EXAMPLE I

An imaging suspension comprising about 1 part of a cyan pigment Monolite Fast Blue GS, the alpha form of metal-free phthalocyanine; C.I. No. 73100, available from Arnold Hoffman Co.; about 6 parts of a magenta pigment, Bonadur Red B, 1-(4'-chloro-5-ethyl-2'-sulfonic acid) azo-benzene-2-hydroxyl-3-naphthoic acid available from American Cyanamid; and about 6 parts of a yellow pigment N-2''-pyridyl-8,13-dioxodinaphtho-(2,1-b; 3',3'-d)-furan-6-carboxamide dispersed in about 100 parts of Sohio Odorless solvent 3440 is prepared and coated onto a NESA plate.

The imaging suspension is exposed to a full color image utilizing a 3200° K lamp, a Kodachrome natural color transparency and a lens. Imagewise illumination is provided while a 2½ inchs aluminum roller with a Tedlar film on the surface is rolled across the imaging suspension in pressure contact as a potential of approximately 3000 volts D.C. is applied between the blocking electrode and the plate, the roller being negative with respect to the plate. An image is formed on the NESA plate.

The illumination is then terminated and a 2½ inchs aluminum roller with a clean Tedlar film on its surface is advanced across the imaging suspension in pressure contact while a potential of approximately 3000 volts D.C. is applied between the blocking electrode and the plate, the roller being negative with respect to the plate. An enhanced positive full-color image is found adhering to the surface of the NESA plate. This image is transferred by pressure contact to paper providing a high quality full-color image corresponding to the original.

EXAMPLE II

The experiment of Example I is repeated with the exceptions that the potential applied during imaging is 2500 volts, the image enhancing potential is 10 volts and during image transfer a potential of 3000 volts is applied. A similar result to that obtained in Example I is achieved.

Although the invention has been described with respect to various preferred embodiments thereof it is not intended to be limited thereto but rather those skilled in the art will recognize that variations and modifications may be made therein which are within the spirit of the invention and the scope of the claims. For example, as is disclosed in U.S. Pat. No. 3,857,707, there may be utilized a dry imaging composition coated member as or on one electrode of the system and the dry imaging layer may be converted into a layer of a suspension immediately before or during the imaging steps.

What is claimed is:

1. In a photoelectrophoretic imaging process which includes providing a blocking electrode having a resisitivity of at least about $10^7$ ohm-cm and an injecting electrode, depositing a thin film of photoelectrophoretic ink upon at least one of said electrodes, confining said thin film between said electrodes in an imaging zone, substantially simultaneously applying an electric field across said confined film and subjecting said confined film to a pattern of activating electromagnetic radiation, and separating said electrodes whereby a pair of complementary images are formed, one on each said electrodes, the improvement comprising:

independently subjecting the image residing on either one or both of said electrodes to an electric field in the absence of further activating electromagnetic radiation, by contacting said image with the surface of a non-image bearing electrode and creating an electrical potential between said non-image bearing electrode and said image bearing electrode, whereby at least a portion of the image is transferred to the non-image bearing electrode thus enhancing the untransferred portion of the image by reducing its $D_{min}$.

2. The method as defined in claim 1 where at least one of said blocking and injecting electrode is at least partially transparent and said exposure is made through said partially transparent electrode.

3. The method as defined in claim 2 wherein said injecting electrode is at least partially transparent.

4. The method as defined in claim 3 wherein the polarity of said first electrical field is the same as that of said second electrical field.

5. The method as defined in claim 4 wherein the magnitude of said second electrical field is greater than that of said first electrical field.

6. The method as defined in claim 3 wherein the polarity of said first electrical field is different than that of said second electrical field and the magnitude of said second electrical field is less than that of said first electrical field.

7. The method as defined in claim 3 wherein said suspension includes at least two differently colored electrically photosensitive pigment particles and a polychromatic image is formed.

8. The method as defined in claim 7 and further including the step of transferring said image to a receiving member.

9. In a photoelectrophoretic imaging process which includes providing a blocking electrode having a resistivity of at least about $10^7$ ohm-cm and an injecting electrode, depositing a thin film of photoelectrophoretic ink upon at least one of said electrodes, confining said thin film between said electrodes in an imaging zone, substantially simultaneously applying an electric field across said confined film and subjecting said confined film to a pattern of activating electromagnetic radiation, and separating said electrodes whereby a pair of complementary images are formed, one on each said electrodes, the improvement comprising:

independently subjecting the image residing on either one or both of said electrodes to an electric field in the absence of further activating electromagnetic radiation, by contacting said image with the surface of a non-image bearing electrode and creating an electrical potential between said non-image bearing electrode and said image bearing electrode, whereby at least a portion of the image is transferred to the non-image bearing electrode thus enhancing the untransferred portion of the image by increasing the degree of color separation.

* * * * *